INVENTOR.
Villem Rahe

ATTORNEY

United States Patent Office 3,352,659
Patented Nov. 14, 1967

3,352,659
APPARATUS FOR BLENDING GLASS
Villem Rahe, Painted Post, N.Y., assignor to Corning Glass Works, Corning, N.Y., a corporation of New York
Filed June 15, 1964, Ser. No. 375,189
4 Claims. (Cl. 65—178)

This invention relates to a new and improved method and apparatus for the blending of thermoplastic material. More particularly, it relates to a contoured vortex filler device and a submarine exit profiling device wherein vortex problems in flowing thermoplastic material which form upstream of a stirring means, are eliminated; and the downstream vortex and flow problems are removed to provide a material exhibiting homogeneity and a symmetrical flow front.

In the continuous melting of thermoplastic material, such as glass, a batch-melting tank or other suitable melting container provides a stream of flowing molten material to a forehearth or other feeding arrangement. In the past, a stirring well was arranged in the following manner. A skimmer would be located on the upstream side of the well, stirring means occupied the downstream stirring well. A vortex problem and an upset flow front resulted from the agitation of the molten material by any rotary stirring means.

The vortex occurred in an area where the push of the stirring means opposed the natural flow of the glass. A highly stagnant area surrounded the vortex. The glass in this highly stagnant area, got a different thermal treatment and a possible composition upset due to a volatilization or prolonged refractory contact. Thus, an inhomogeneity was produced in the glass. This inhomogeneity was especially noticeable when the vortex was downstream of the stirring means. A deleterious vortex cord was created in the molten glass as it continued to flow down the forehearth channel. The cord permeated the molten material to such an extent that a substandard end product resulted.

Further, with the conventional skimmer provided on the upstream side of the stirring means, glass flowing from the zone of influence of the stirring means was unrestricted. Consequently the "push" of the stirring means caused a glass pile-up on one side of the forehearth. Glass flow was favored in the direction of the stirrer rotation and impeded on the other side. An undesirable non-symmetrical flow front profile resulted.

With the non-symmetrical flow front, downstream burner arrangement was difficult since a temperature differential in the flowing glass required non-symmetrical burner arrangement to avoid a temperature differential at delivery points.

My invention provides a blending unit wherein a stir well or chamber is provided in a glass forehearth. A circulating and pumping means, such as a stirrer, is positioned within the stir well. A vortex filler device is located upstream of the stir well. The filler means is positioned and shaped to counteract an upstream vortex originating from the stirrer action. Thus a "dead" area is eliminated, leaving the usable cross-section of flowing molten material essentially unchanged.

Positioning a submarine profiling device downstream with respect to the glass flow through the stir well and transitioning the flow forward and up at the exit of the stir well provides a double baffle arrangement. Thus the action of the stirring means is cushioned both upstream and downstream.

My blending unit thus eliminates upstream and downstream vortex defects and yields an essentially symmetrical flow leaving the stir well. This, in turn, aides the thermal conditioning and homogeneity of the glass after stirring.

It thus has been an object of my invention to blend the cord of any origin upstream of a stirrer chamber.

A further object of my invention is to provide a symmetrical desirable flow pattern leaving the stir well, free of vortices and stagnant areas.

An additional object of my invention is to avoid excessive drawdown or impedance through the stir chamber.

A further object of my invention is to provide a single stir well construction, yet deliver a symmetrical flow of material to a delivery means.

It is also an object of my invention to cause no significant level fluctuations which might interfere with weight control.

A further object of my invention has been the elimination of cord and production of a symmetrical flow pattern at reasonable stirring speeds, independent of feeder speeds.

Another object of my invention is to provide a blending unit which lends itself to a symmetrical downstream burner arrangement.

Other objects and advantages of this invention will be shown in the following detailed description of a preferred embodiment thereof as illustrated in the accompanying drawing in which.

Figure 2:
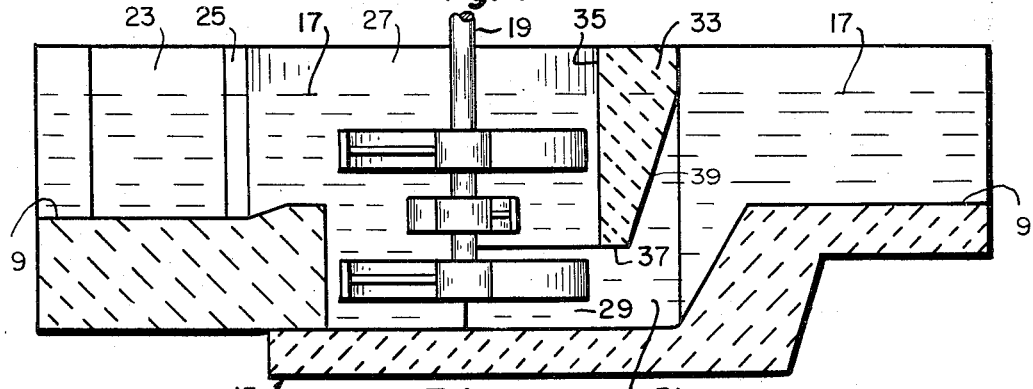
FIG. 2 is a sectional view taken along line 2—2 of FIG. 1.

Referring now to the drawings, molten thermoplastic material, such as glass, provided by a suitable melting means or container, continuously flows through a forehearth channel 9, which is laterally defined by vertically disposed refractory sidewalls 11 and 13 that are joined to a refractory bottom portion 15 (FIG. 2). Normal glass line 17 represents the upper surface of the flowing molten material. The flowing molten material contains thermal gradients and deleterious inclusions in the form of a cord which must be dispersed to provide a homogeneous product to a forming means.

Figure 1:
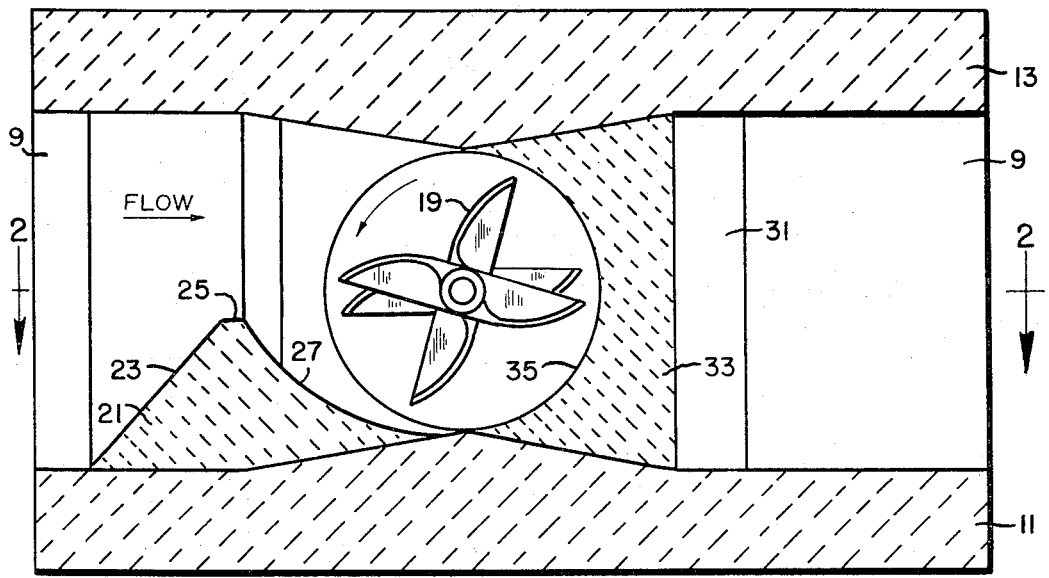
FIG. 1 is a top plan view of a forehearth embodying my blending unit.

A circulating and pumping means, such as a screw-type impeller 19 (FIG. 1), of any known configuration, is provided to produce efficient blending. Advantageously, the impeller 19 is adapted for rotation to impart a circular motion to the body of the flowing molten glass in a manner suitable to homogenize the molten glass and disperse the deleterious inclusions. Disadvantageously, under ordinary circumstances, a vortex results from the circulating action, upstream of the impeller 19 causing problems such as off-composition glass and partial devitrification.

Vortex filler means or block 21, of my invention, is located on the upstream side of circulating or pumping means 19. The deleterious vortex area is replaced by vortex filler means 21. It is within the scope of the invention to situate vortex filler block 21 on one lateral side of the forehearth channel or the other. Since the location of the vortex area is dependent upon direction of rotation of circulating means 19 the lateral location of vortex filler block 21 is thus dependent upon direction of rotation of circulating means 19. With pumping means 19 oriented so that the glass flow is down through a stir well or chamber 29, spiralling within the vortex follows the direction of impeller pumping. That is, spiralling up when the impeller is pumping up and spiralling down when the impeller is pumping down. In both cases, the vortex, and therefore the vortex filler means 21 of my blending unit, are positioned against the vertically disposed refractory sidewall against which the circulating means 19 is acting.

Glass deflecting section 23 of vortex filler means 21 is inwardly inclined from the refractory sidewall along the lateral line of glass flow and thus narrows the path available to the flowing material. In a preferred embodiment, a flattened point apex section 25, substantially parallel to the line of glass flow is provided. In another embodiment, apex section 25 is foreshortened. It is within the scope of this invention to lengthen the point apex section, thus producing a somewhat flatter face, however, if the point apex section 25 is lengthened appreciably, another small vortex appears just next to this flat face. Re-entrant section 27 of vortex filler block 21 inclines or diverges outwardly to re-intersect with the respective forehearth refractory sidewall.

Thus the upstream vortex problem is minimized by using vortex filler means 21, completely filling the area where a vortex would have otherwise occured. The installation of such a filler in the forehearth channel does not produce any increased drawdown since only a "dead" area is eliminated and the usable cross-section remains essentially unchanged. It is within the scope of use of the vortex filler means to combine the filler means with any rotating device such as a stirrer, needle or sleeve to eliminate a vortex problem.

Figure 3:
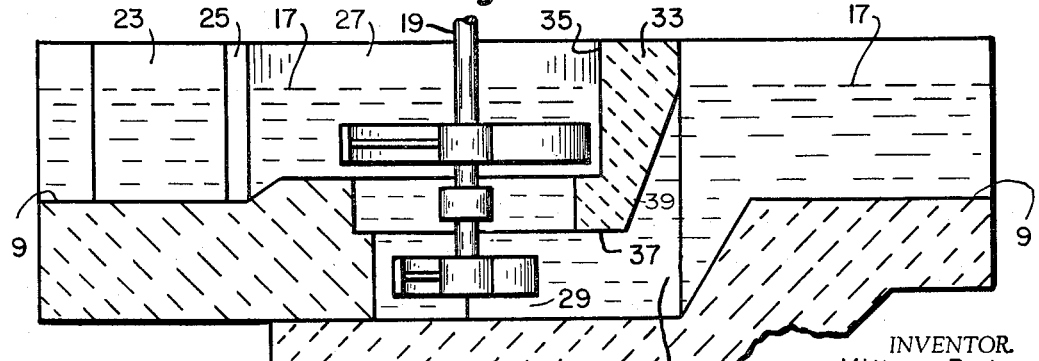
FIG. 3 is a side sectional view, illustrating another form of a blending unit in which a stepped well is provided.

The circulating means 19 projects down to a stir well or chamber 29 situated in refractory bottom portion 15. In operation, the molten glass continuously flowing through forehearth channel 9 is blended by the circulation of impeller 19. The circulating means may be of any wanted configuration to blend the flowing material to any desired quality. The stir well is situated downstream of vortex filler means 21, laterally across refractory bottom portion 15 between vertically disposed refractory sidewalls 11 and 13. It is within the scope of the present invention to provide a multi-step well as shown in FIG. 3 and an associately modified circulating means. With greater exposed surface area of the multi-step well unit and significantly a greater stirring action, blending capabilities are improved. Steps in the well, thus, provide a greater area for shear forces to act against and at the same time prevent channeling.

As the homogenized glass leaves the sphere of influence of the circulating means, it passes forward through slot or outlet 31, transitions upwardly seeking normal glass line 17, and flows forward with a symmetrical glass flow profile. Thus by passing through a slot, an even velocity of glass is delivered. That is, that after doing a good job of blending, glass can be rapidly delivered to a forming process with an even flow profile.

The laterally extending outlet 31 is formed by and is directly below submarine profiling means 33. The profiling means depends vertically between sidewalls 11 and 13 and extends into the flowing glass downstream of circulating means 19. It is advantageous to remove an upset downstream flow front and vortex which ordinarily result from the agitation of the molten material due to the rotation of impeller 19. The conventional downstream profile becomes nonsymmetrical since glass flow is favored in the direction of rotation and impeded on the opposite side. Thus glass gets a different thermal treatment and composition is upset due to volatilization or prolonged refractory contact. Hence, an inhomogeneity exists in the glass.

My profiling means 33 comprises an arcuate deflector section 35 conforming to the sweep of circulating and pumping means 19. The clearance or coupling between the pumping means 19 and arcuate deflector section 35 is such to assure that all flowing molten glass comes within the scope of influence of circulating means 19. Thus, the molten glass is subjected to a repeated shearing action which serves to attenuate and eliminate any deleterious inclusions, such as cord or striae, and is thoroughly homogenized before flowing forward.

It is within the scope of the present invention to step arcuate deflector section 35, as shown in FIG. 3, to provide a greater shearing action between the impeller and the stepped deflector section, thus improving blending capabilities. It is further within the scope of this invention to provide multiple, arcuate deflector sections, laterally spaced across the upstream side of profiling means 33 to accommodate an array of multiple pumping means.

The preferred embodiment of my profiling means 33 provides a flat base portion 37, which is parallel to the normal line of flow of the flowing molten glass and establishes beneath it outlet 31. In a preferred embodiment of submarine profiling means 33, return section 39, on the downstream side of profiling means 33 inclines upwardly from base 37 toward the normal glass line to provide for the upward transition of the glass. Thus my submarine profiling means 33 essentially brings all flowing glass under the influence of circulating means 19, then transitions the glass forward and up on the downstream side of the stirring means. The glass then, as it continues to flow forward down forehearth channel 9, after having been influenced by profiling means 33, exhibits a symmetrical glass flow front and uniform homogeneity. Positioning the profiling means downstream with respect to the flow through stir chamber 29 and transitioning forward and up under the influence of outlet 31 and return section 39, a double baffle arrangement exists which cushions the action of the circulating means and yields an essentially symmetrical flow leaving the stir chamber. This, in turn, aides the thermal conditioning and homogeneity of the glass after circulating.

Although I have described my invention with respect to certain specific embodiments thereof, I do not wish to be thereby limited, as various modifications of my invention are intended to be encompassed within its true spirit and scope as indicated by the following claims.

I claim:

1. In a channel for the flow of molten glass, which channel includes sidewalls and a bottom wall, improved flow control means comprising:
   a stirrer rotatable in said channel about a vertical axis,
   an inwardly projecting portion on one said sidewall on the upstream side of said stirrer, said inwardly projecting portion occupying a region of said channel at which said stirrer would otherwise tend to produce a vortex, and
   a deflecting wall extending between said sidewalls on the downstream side of said stirrer, said deflecting wall being spaced from said bottom wall of said channel so as to form a passage for the flow of molten glass and extending upwardly at least to the surface of said molten glass and across substantially the width of said channel between said sidewalls, said deflecting wall having an upstream surface which is arcuate in horizontal cross-section and which is closely spaced from the horizontal ends of said stirrer during rotation thereof.

2. The improvement according to claim 1 in which said inwardly projecting portion is inclined inwardly from the said sidewall toward which said stirrer tends to direct glass on the upstream side of said stirrer.

3. The improvement according to claim 1 in which said deflecting wall has an upstream surface which is generally semicircular in horizontal cross-section.

4. The improvement according to claim 1 in which said stirrer is located in a depressed portion of said bottom wall of said channel and in which said deflecting wall, said sidewalls and said bottom wall of said channel form a passage which is inclined upwardly in the downstream direction with respect to said channel.

References Cited

UNITED STATES PATENTS

| | | | |
|---|---|---|---|
| 2,467,809 | 4/1949 | Cannon et al. | 65—134 |
| 3,057,175 | 10/1962 | Rough et al. | 65—178 |
| 3,216,812 | 11/1965 | Silverman | 65—134 |
| 3,268,213 | 8/1966 | Cala | 65—178 |

DONALL H. SYLVESTER, *Primary Examiner.*

S. LEON BASHORE, *Examiner.*

G. R. MYERS, *Assistant Examiner.*